United States Patent [19]
Ouchi et al.

[11] Patent Number: 5,695,289
[45] Date of Patent: Dec. 9, 1997

[54] ROLLING BEARING UNIT HAVING TONE WHEEL

[75] Inventors: Hideo Ouchi; Yuji Nakamura, both of Fujisawa, Japan

[73] Assignee: NSK, Ltd., Tokyo, Japan

[21] Appl. No.: 679,367

[22] Filed: Jul. 10, 1996

[30] Foreign Application Priority Data

Jul. 10, 1995 [JP] Japan ............... 7-173219
Jan. 19, 1996 [JP] Japan ............... 8-007525

[51] Int. Cl.$^6$ ............................................. F16C 19/08
[52] U.S. Cl. .................................. 384/448; 324/174
[58] Field of Search ........................ 384/448, 446; 324/173, 174, 207.25

[56] References Cited

U.S. PATENT DOCUMENTS

| 5,143,458 | 9/1992 | Alff et al. ............... 384/448 |
| 5,261,752 | 11/1993 | Ouchi et al. ............ 384/448 |
| 5,421,654 | 6/1995 | Rigaux et al. .......... 384/448 |
| 5,431,413 | 7/1995 | Hajzler .................... 277/2 |
| 5,458,420 | 10/1995 | Otto ....................... 384/448 |
| 5,530,344 | 6/1996 | Caillaut et al. ........ 324/174 |
| 5,564,839 | 10/1996 | Ouchi et al. .......... 384/448 |

FOREIGN PATENT DOCUMENTS

| 487405 | 5/1992 | European Pat. Off. |
| 511106 | 10/1992 | European Pat. Off. |
| 597238 | 5/1994 | European Pat. Off. |
| 2700588 | 7/1994 | France |
| 4323444 | 1/1994 | Germany |
| H3-17324 | 2/1991 | Japan |
| H4-25024 | 2/1992 | Japan |
| H5-23136 | 3/1993 | Japan |
| H5-69464 | 9/1993 | Japan |
| H6-6562 | 9/1994 | Japan |

Primary Examiner—Thomas R. Hannon
Attorney, Agent, or Firm—Evenson, McKeown, Edwards & Lenahan P.L.L.C.

[57] ABSTRACT

A rolling bearing unit having a tone wheel and a seal device which has an elastic seal member and a core metal to reinforce the elastic seal member to seal the space where the rolling members are provided, the tone wheel comprising an annular multi-pole magnet with South and North poles alternately arranged in a circumferential direction an supported by the generally annular seal ring.

3 Claims, 8 Drawing Sheets 5,695,289

1

ROLLING BEARING UNIT HAVING TONE WHEEL

FIELD OF THE INVENTION

The present invention is related to a rolling bearing unit having a tone wheel to rotatably support a vehicle wheel with respect to a suspension apparatus while providing a rotating speed sensor to detect the rotating speed of the vehicle wheel.

DESCRIPTION OF THE RELATED ART

The rotating speed of the vehicle wheel, specifically free wheel (front wheel of the FR vehicle and rear wheel of the FF vehicle) must be detected in order to control the antilock brake system (ABS) or the traction control system (TCS). Accordingly, the rolling bearing unit must have a rotating speed sensor to detect the rotating speed of the vehicle wheel while rotatably supporting the vehicle wheel with respect to the suspension apparatus.

For example, U.S. Pat. No. 4,968,156, U.S. Pat. No. 5,431,413 and JP First Publication KOKAI No. H6-65864 disclose an example of the conventional rolling bearing units having a rotating speed sensor. FIGS. 1 and 2 show the rolling bearing unit having the rotating speed sensor of the U.S. Pat. No. 4,968,156.

A pair of stationary bearing rings or inner rings $2a$, $2b$ are connected by a coupling ring 1 and fitted over a stationary axle 3. The both inner rings $2a$, $2b$ are clamped between the holder 4 and nut 5. Formed on the outer peripheral surface (first peripheral surface) of the inner rings $2a$, $2b$ are inner ring raceways (first raceways) 6.

Formed on the inner peripheral surface (second peripheral surface) of the rotatable outer bearing ring or hub 7 are outer raceways (second raceways) 8 in double rows. Disposed between the outer raceways 8 and inner raceways 6 are a plurality of balls 9 to rotatably support the hub 7 around the axle 3. A vehicle wheel 10 is fixed to a flange 11 on the outer peripheral surface of the hub 7.

There is an opening portion on the axially inner end of the hub 7, where a seal ring 12 comprising a core metal 13 is provided. The core ring 13 is fitted into the opening portion of the hub 7.

The term "axially inner" means in this specification the inner side in the width direction in the condition assembled in the vehicle (right side e.g. in FIG. 1) while the term "axially outer" means the outer side in the width direction in the vehicle.

A cylindrical portion 18 is formed in the outer peripheral rim portion of the core metal 13 and fitted into the opening portion of the hub 7 in the interference relationship. Supported by the core metal 13 is a tone wheel 14 comprising a permanent magnet or permanent magnets and formed in an annular shape with alternative arrangement of South and North poles in a circumferential direction.

The axially inner one $2b$ of the inner rings $2a$, $2b$ has its axially inner end fitted into a support ring 15 formed from a metal plate through a deep-drawing step. The seal ring 12 has a seal member 16 the tip end of which is provided in a sliding contact relationship with the inner peripheral surface and the axially outer surface of the support ring 15, so that dust and rain water are prevented from entering the space where the balls 9 are provided.

A sensor 17 is fixedly supported by part of the support ring 15, so that the detecting part of the sensor 17 is faced to the axially inner surface of the tone wheel 14.

2

With the rolling bearing unit having a rotating speed sensor as mentioned above, the vehicle wheel fixed to the hub 7 is rotatably supported with reference to the axle 3 onto which the inner rings $2a$, $2b$ are supported in a fitting relationship. When the hub 7 is rotated together with the vehicle wheel, the output of the sensor, which is faced to the axially inner side surface of the tone wheel 14 fixed to the hub 7, is changed. The frequency at which the output of the sensor 17 is changed is proportional to the rotating speed of the vehicle wheel. Accordingly, by inputting the output signal of the sensor 17 to a control device (not shown), the rotating speed of the vehicle wheel is obtained to properly control the ABS and TCS.

Other than U.S. Pat. No. 4,968,156, U.S. Pat. No. 4,948,277 and FR Patent Publication No. 2,642,483 etc. disclose a similar rolling bearing unit having a rotating speed sensor.

In the construction, however, the width $W_{14}$ in a radial direction of the tone wheel 14 can not be sufficiently large in size, and it can be difficult to securely and sufficiently obtain the density of magnetic flux in the section of the sensor 17.

Specifically, in the case of the conventional structure as shown in FIGS. 1 and 2, the tone wheel 14 is located between the inner peripheral surface at the axially inner end of the hub 7 and the outer peripheral surface at the axially inner end of the inner ring $2b$. Accordingly, the width $W_{14}$ is substantially smaller in size than the width $W_{19}$ of the opening portion 19 between the inner peripheral surface of the hub 7 and the outer peripheral surface of the inner ring $2b$ at the axially inner end ($W_{14} << W_{19}$), to avoid the interference between the tone wheel 14, core metal 13 and support ring 15.

It is hard to obtain a sufficiently large amount of magnetic force in the tone wheel 14 if the width $W_{14}$ of the tone wheel 14 made from permanent magnet is smaller. Consequently, the density of magnetic flux in the section of the sensor 17 is lowered, which in turn lowers the detection signal outputted from the sensor 17 as the vehicle wheel rotates and makes it difficult to keep the precision in speed detection of the vehicle wheel.

FIG. 3 shows a construction disclosed in U.S. patent application Ser. No. 5,431,413.

The outer peripheral surface of the axle 3 rotating with the vehicle wheel is fitted into a first seal ring 102 comprising a first core metal 103 and a first elastic member 104 of magnetic rubber.

The first elastic member 104 is provided with South and North poles alternately arranged in a circumferential direction on its side surface.

A stationary outer ring 7 is supported by a suspension apparatus and has its inner peripheral surface at the axially inner end fitted onto a second seal ring 105 comprising a second core metal 106. Seal lips 108 are formed on the second resilient member 107 of the second seal ring 105 and provided in a sliding contact relationship with the outer peripheral surface and axially outer side surface (left side surface in FIG. 3) of the first core metal 103.

The rolling bearing unit having the first and second seal rings 102, 105 rotatably supports the vehicle wheel with reference to the suspension apparatus, and combined with a sensor (not shown) to detect the rotating speed of the vehicle wheel. The signal of rotating speed is thus obtained and utilized to control the ABS and TCS. A pair of seal lips 108 are provided to prevent foreign materials such as rain water from entering the rolling bearing unit.

In the conventional construction of FIG. 3, the freedom of design of the seal ring is small due to the fact that the first elastic member 104 of the first seal ring 102 is used for a multi-pole magnet, so that while the first seal ring 102 works as a tone wheel.

Specifically, in order to securely detect the rotating speed, a certain amount of space for accommodating the first seal ring 102 having the first elastic member 104 must be secured to keep the magnetic force of the first elastic member 4. Accordingly, it is difficult to make compact the rolling bearing unit with the tone wheel and with the seal ring. In addition, the shape of the first and second seal rings 102, 105 must be changed between the case where the shaft 3 rotates and the case where the outer ring 7 rotates, so that it is difficult to use the common seal ring.

In addition, the production cost of the seal rings 102, 105 are high because the sealing performance of the seal rings 102, 105 must be secured in order to prevent the foreign materials from entering the rolling bearing unit.

SUMMARY OF THE INVENTION

An object of the present invention is to provide a rolling bearing unit having a tone wheel by which the problems as mentioned above are overcome.

An object of the present invention is to provide a rolling bearing unit having a tone wheel and a seal device which has an elastic seal member and a core member to reinforce the elastic seal member to seal the space where the rolling members are provided, the tone wheel comprising an annular multi-pole magnet with South and North poles alternately arranged in a circumferential direction and supported either by the generally annular seal ring or by the outer ring outside the annular seal ring.

DETAILED DESCRIPTION OF THE PREFERRED EMBODIMENTS

Figure 1:
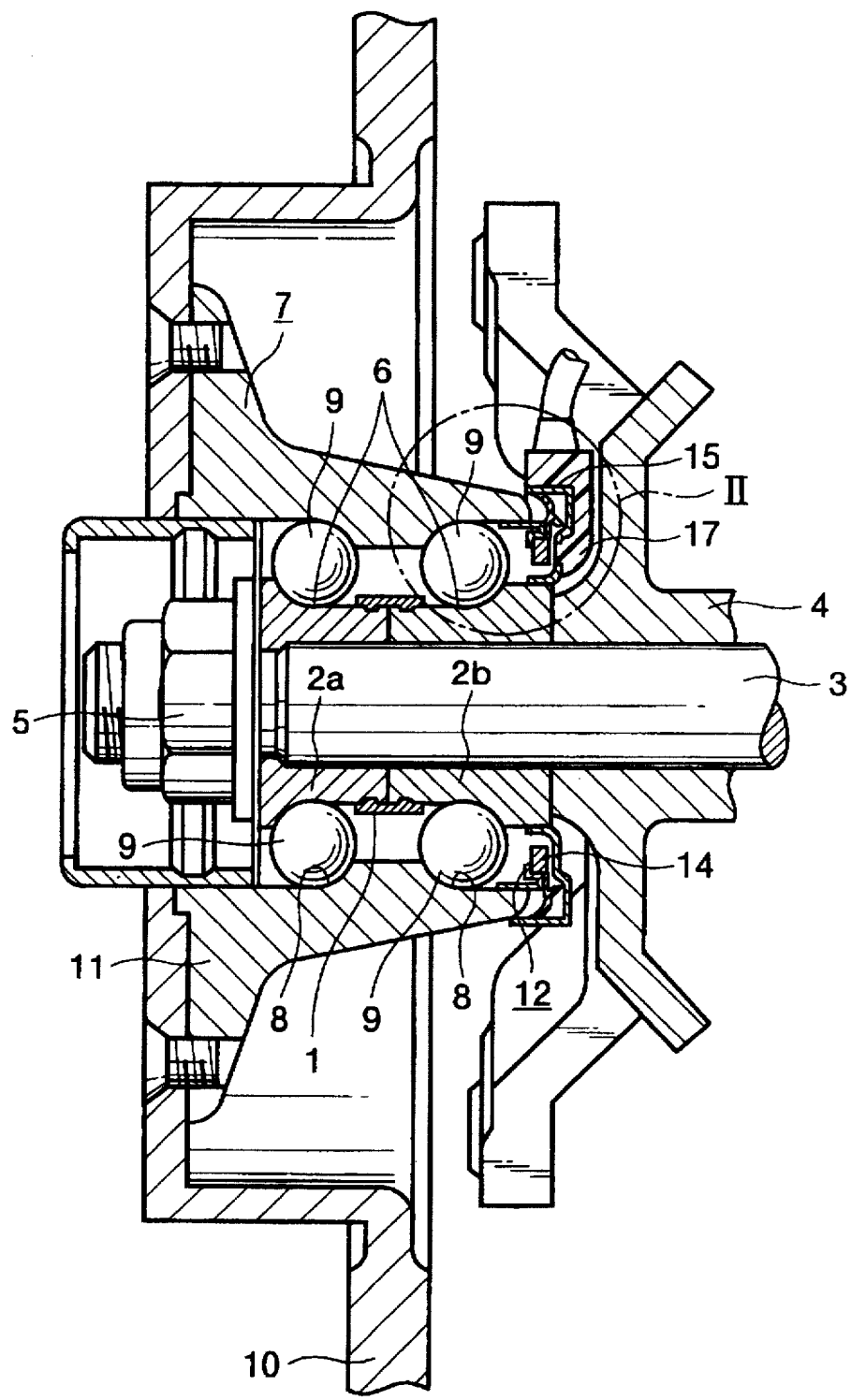
FIG. 1 is a cross sectional view of one half of a prior art bearing section.

The rolling bearing unit having a tone wheel in one feature of the present invention does basically comprise a stationary bearing ring having a first peripheral surface on which a first raceway is formed, a rotatable bearing ring having a second peripheral surface on which a second raceway is formed, a plurality of rolling members provided between the first and second raceways, a seal device comprising a seal ring in a generally annular shape having an elastic seal member and a core metal to reinforce the elastic seal member to cover the opening at one end of the space between the first and second peripheral surfaces, and a tone wheel comprising an annular multi-pole magnet with South and North poles alternately arranged in a circumferential direction and supported by the generally annular seal ring.

In addition, part of the generally annular seal ring is projected out of the space from the opening at the axially inner end of the space.

The tone wheel is supported on the axially inner side surface of the generally annular seal ring.

The outer diameter of the tone wheel is larger in size than the inner diameter of the opening portion at the axially inner end of the outer bearing ring which is the radially outer one of the stationary and rotatable bearing rings, and the inner diameter of the tone wheel is smaller in size than the inner diameter of the opening portion at the axially inner end of the outer bearing ring.

The rolling bearing unit having a tone wheel of the present invention rotatably supports a vehicle wheel and detects the rotating speed of the vehicle wheel fixed to the rotatable bearing ring through combination with the sensor. This, supporting and detecting manner is substationally the same as the conventional rolling bearing units having a tone wheel.

Particularly, in the present invention, the width of the tone wheel in a radial direction can be sufficiently large to increase the density of magnetic flux in the sensor section and to increase the output of the sensor.

In another feature of the present invention, the rolling bearing unit comprises a rotatable outer ring having an inner peripheral surface on which an outer ring raceway is formed, a stationary inner ring having an outer peripheral surface on which an inner ring raceway is formed, a plurality of rolling members provided between the outer and inner ring raceways, a seal ring provided between the outer peripheral surface at one end of the inner ring and the inner peripheral surface at one end of the outer ring to seal between the peripheral surfaces, and a tone wheel provided at one end of the outer ring in a concentric relation with the outer ring to have S-poles and N-poles arranged alternately in a circumferential direction.

The tone wheel is supported at a portion of the outer ring outside the seal ring and fixed to the portion, independent from the seal ring. The tone wheel has an inner peripheral edge close to the end portion of the inner ring to form a labyrinth seal.

Figure 4:
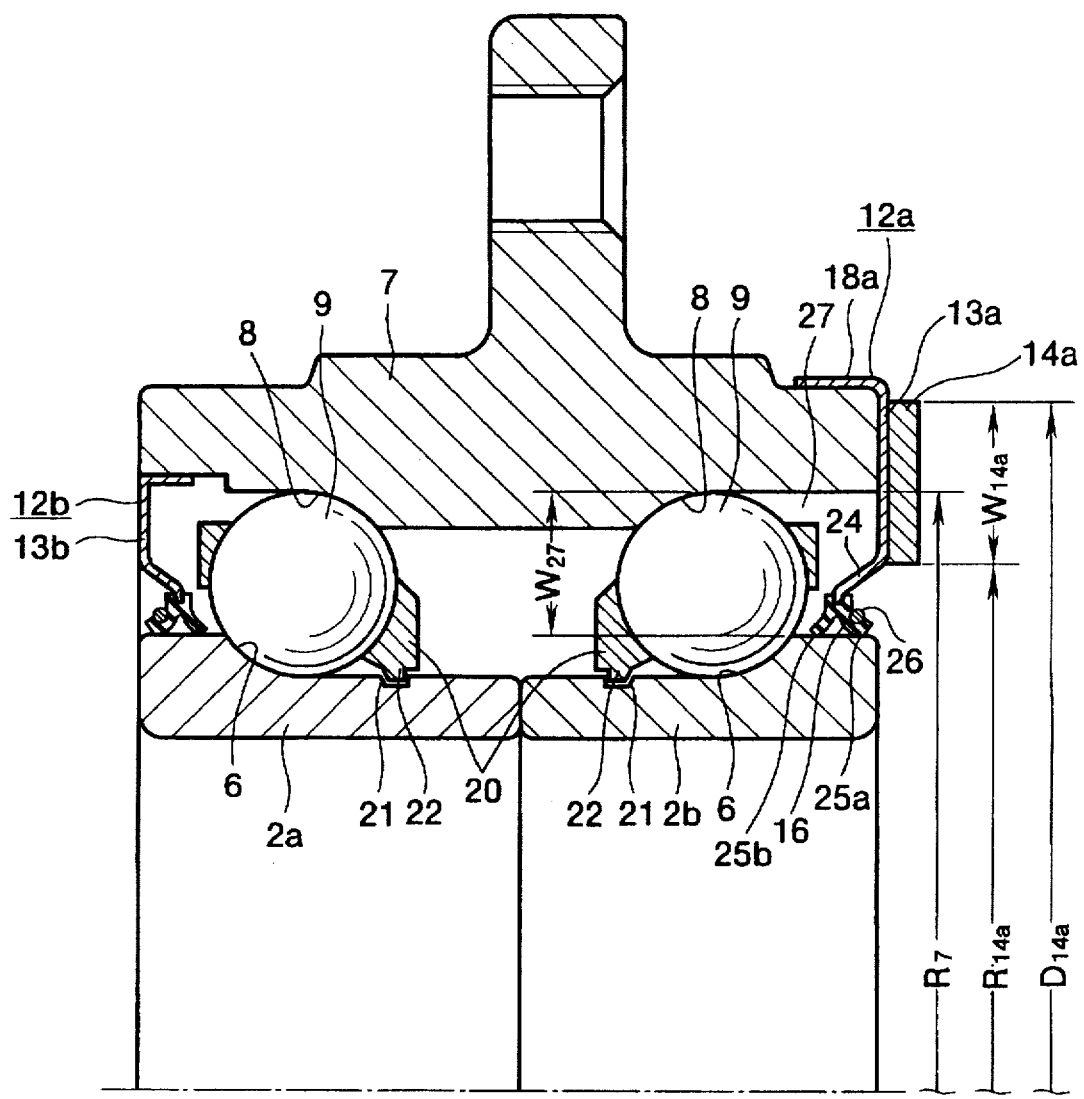
FIG. 4 is a cross sectional view showing one embodiment of the present invention.

FIG. 4 shows a first embodiment of the present invention. Stationary bearing ring inner rings 2a, 2b are formed with first raceway or inner ring raceways 6 on their outer peripheral surface or first peripheral surface, respectively.

A stationary axle 3 (FIG. 1) is fitted into the inner rings 2a, 2b.

Disposed around the inner rings 2a, 2b is a hub 7 which is a rotatable bearing ring outer ring in a concentric relationship with the inner rings 2a, 2b. Second raceways or outer ring raceways 8 in double row are formed on the second peripheral surface or inner peripheral surface of the hub 7.

A plurality of rolling members or balls 9 are provided between the outer ring raceways 8 and the inner ring raceways 6 so as to rotatably support the hub 7 around the inner rings 2a, 2b.

Tapered rollers can be used instead of the balls 9 as the rolling members in the rolling bearing unit for use in heavy vehicles throughout the embodiments in the application.

The balls 9 between the outer and inner ring raceways in each row are rotatably held by a retainer or cage 20, respectively.

An annular groove 21 is formed on the outer peripheral surface of the inner rings 2a, 2b while an annular projection 22 is formed on the inner peripheral surface of the retainer or cage 20.

The grooves 21 are engaged with the projections 22, so that the inner rings 2 are prevented from being separated before installation onto the axle 3, even if the coupling ring 1 (FIG. 1) in the prior art construction is omitted.

Fitted onto the axially inner end of the hub 7 is a seal ring 12a having a core metal 13a, so that the space 27 between the inner peripheral surface of the hub 7 and the outer peripheral surface of the inner rings 2a, 2b is closed at the axially inner opening portion.

The core metal 13a is formed in a generally annular shape and has a substantially J-shape in cross section.

The radially outer rim of the core metal 13a is bent axially outwards at right angles (leftward in FIG. 4) to form a cylindrical portion 18a which is fitted and fixed to the axially inner end of the hub 7.

The radially inner rim of the core metal 13a is slightly bent axially outwards to form a bent rim portion 24 the inner peripheral edge of which an elastic seal member 16 is fixed to, for example by fusion bonding.

The seal member 16 has a yoke-shaped inner peripheral edge portion where a pair of seal lips 25a, 25b are formed.

The seal lips 25a, 25b have their inner peripheral edge disposed in a sliding contact with the outer peripheral surface at the axially inner end of the inner ring 2b so as to sealingly close the opening portion of the rolling bearing unit on the axially inner end side.

The seal lip 25a closer to the opening has its outer peripheral surface retained by the support ring 26 so as to sufficiently obtain the sealing performance between the inner peripheral edge of the seal lip 25a and the outer peripheral surface of the inner ring 2b.

At the axially outer end of the hub 7, the seal ring 12b having a core metal 13b is fitted into teh hub 7 so as to close the axially outer opening of the space 27.

An annular tone wheel 14a is supported and fixed, e.g. by adhesive, on the axially inner side of the core metal 13a.

The tone wheel 14a is comprised of a multi-pole permanent magnet arranged in an annular shape. Specifically, S-poles and N-poles are alternately arranged in a circumferential direction with a uniform space therebetween.

The outer diameter $D_{14a}$ of the tone wheel 14a is larger than the inner diameter $R_7$ of the opening portion of the hub 7 at its axially inner end ($D_{14a} > R_7$).

The inner diameter $R_{14a}$ of the tone wheel 14a is smaller than the inner diameter $R_7$ of the hub 7 ($R_{14a} < R_7$).

Figure 2:
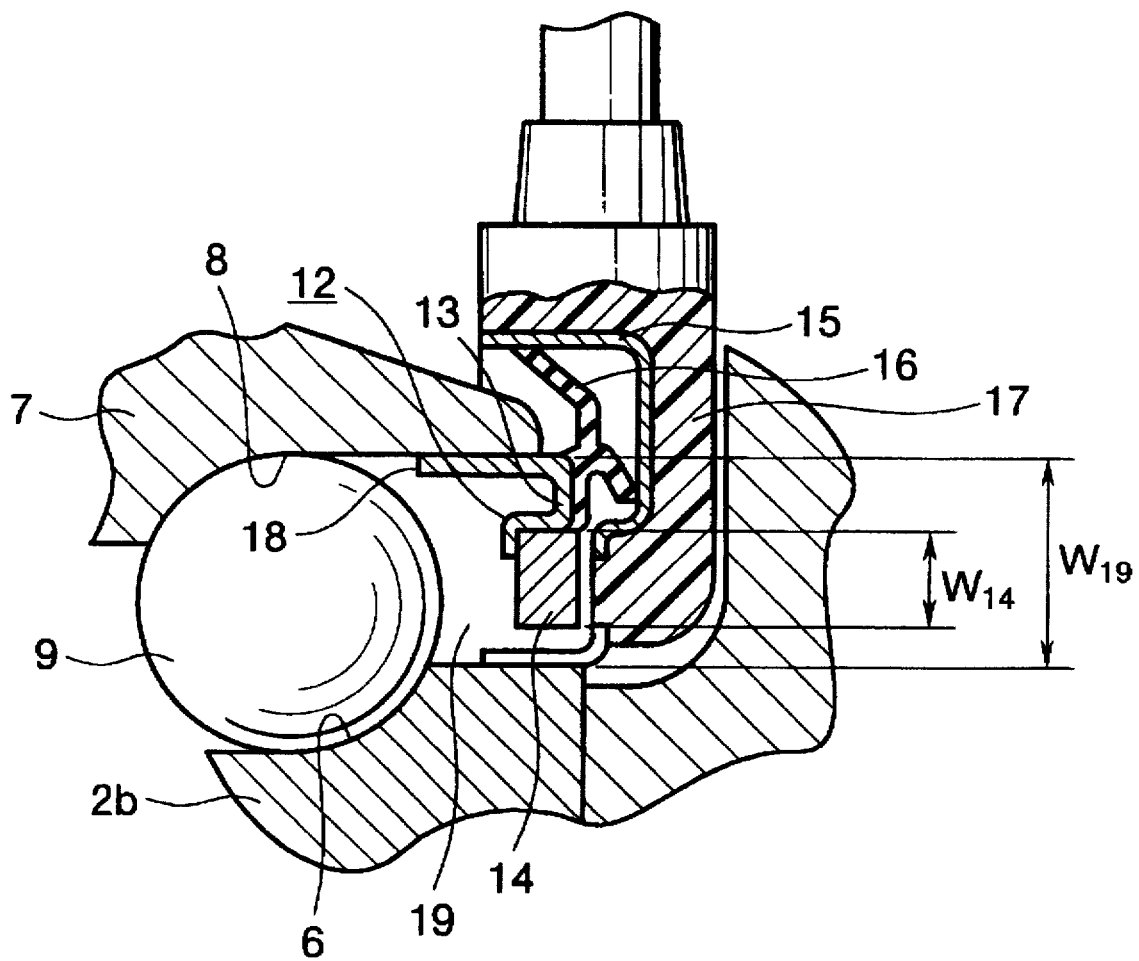
FIG. 2 is an enlarged view of the section II of FIG. 1.
Figure 3:
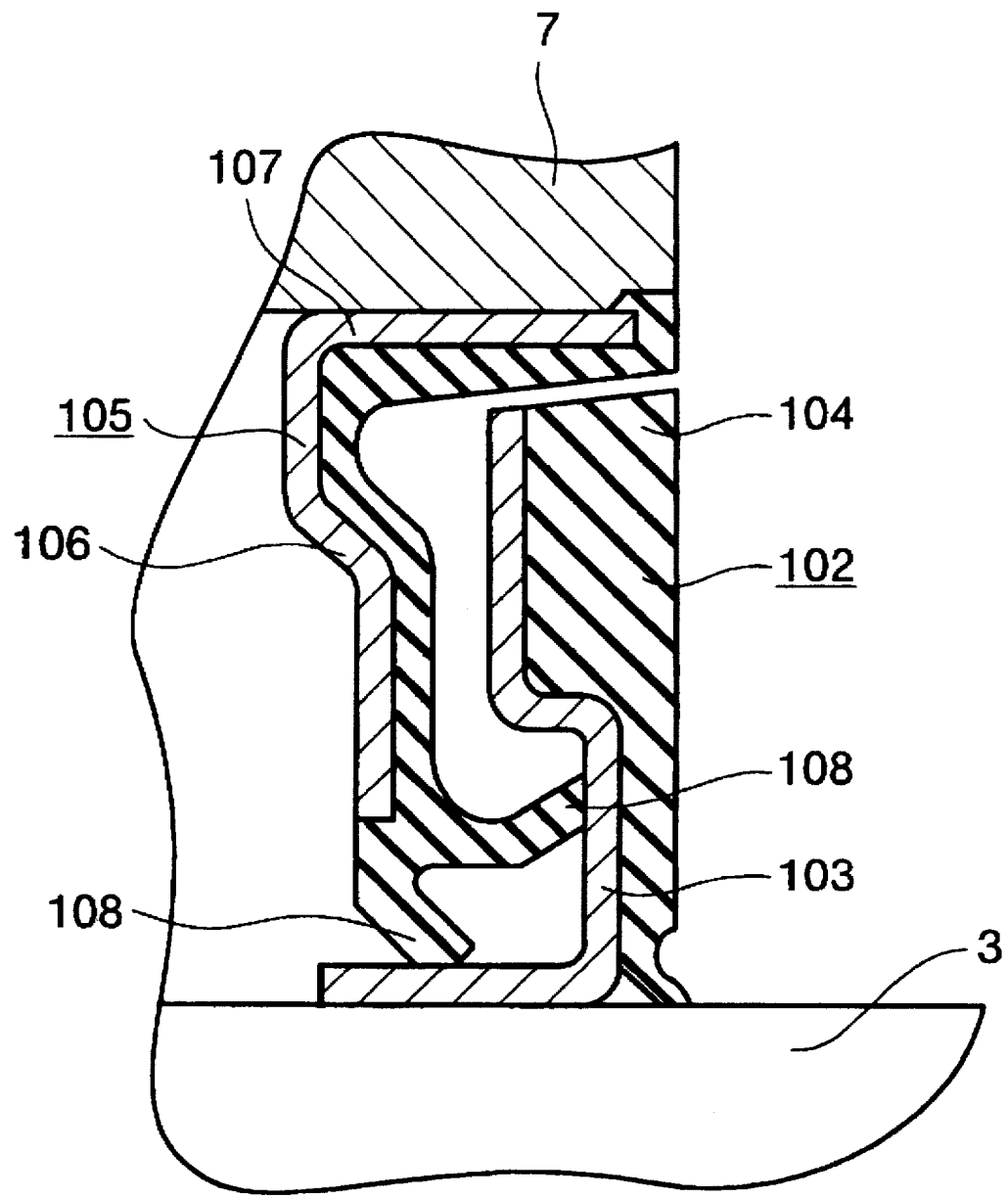
FIG. 3 is a cross sectional view of a conventional seal ring structure.

The rolling bearing unit having a tone wheel constructed as mentioned above in the present invention is used to rotatably support a vehicle wheel around the stationary axle 3 and to detect the rotating speed of the vehicle wheel fixed to the hub 7 in the same manner as the prior art rolling bearing unit shown in FIGS. 1 and 2.

In particular, the width $W_{14a}$ in a diameter direction of the tone wheel 14a can be sufficiently large in the rolling bearing unit of the present invention, regardless of the width $W_{27}$ of the opening portion at the axially inner end of the space 27.

Accordingly, the magnetism strength of the tone wheel 14a made from the permanent magnet can be made larger to increase the density of the magnetic flux from the tone wheel 14a into the portion of the sensor 17, thereby increasing the output of the sensor 17.

Figure 5:
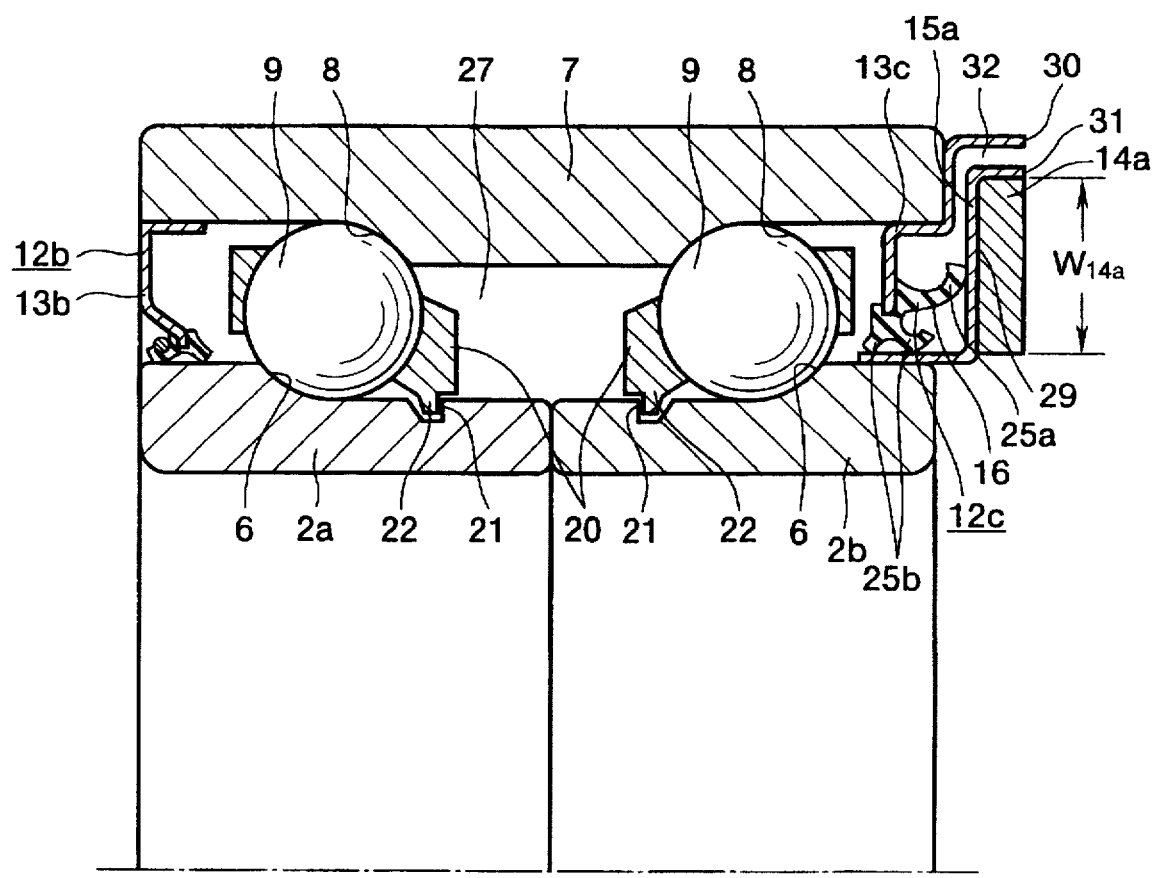
FIG. 5 is a cross sectional view showing another embodiment of the present invention.

FIG. 5 shows a second embodiment of the present invention, where the inner rings 2a, 2b are the rotatable bearing ring while the outer ring 7 is the stationary outer bearing ring.

The outer ring 7 is securely held inside the bearing box (not shown).

The space 27 is provided between the inner peripheral surface of the outer ring 7 and the outer peripheral surfaces of the inner rings 2a, 2b and the axially inner opening is closed by the seal device comprising an annular seal ring 12c and annular support ring 15a, referred to as combination seal.

The seal ring 12c has a seal member 16 having seal lips 25a the tip end of which is slidingly engaged with the support ring 15a.

The tone wheel 14a is supported by and fixed to, through adhesive, the axially inner side surface of the annular portion 29 of the support ring 15a.

Accordingly, the width $W_{14a}$ in a diameter direction of the tone wheel 14a can be sufficiently larger to increase the output of the sensor 17 (FIGS. 1 and 2).

In the embodiment shown in FIG. 5, the core metal 13c of the seal ring 12c is fitted into the outer ring 7, and the support ring 15a is fitted onto the inner ring 2b, where the tip edge 30 of the core metal 13c and the tip end 31 of the support ring 15a are positioned on the same plane.

When the core metal 13c is fitted to the outer ring 7 and the support ring 15a is to the inner ring 2, the tip face of the pressing jig is abutted to the tip edges 30, 31 to simultaneously press the core metal 13c and support ring 15a.

Consequently, the position relationship between the core metal 13c and the support ring 15a can be precisely controlled as required.

The small gap 32 between the tip edge 30 of the core metal 13c and the tip edge 31 of the support ring 15a works as a labyrinth seal to prevent foreign materials such as dirty water from entering the portion where the seal lips 25a, 25b are slidingly provided.

In addition, since the tip edge 30 of the core metal 13c and the tip edge 31 of the support ring 15a are positioned on the same plane while the tone wheel 14a is covered by the cylindrical surface of the core metal 13c, the tone wheel 14a is prevented from erroneously bumped by another article upon installation and transportation.

Therefore, the damage of the tone wheel 14a and/or displacement of installation position can be hardly caused.

The rolling bearing unit having a tone wheel in the present embodiments can provide a larger sensor output to increase the reliability in the detection of the rotating speed of the vehicle wheel.

Figure 6:
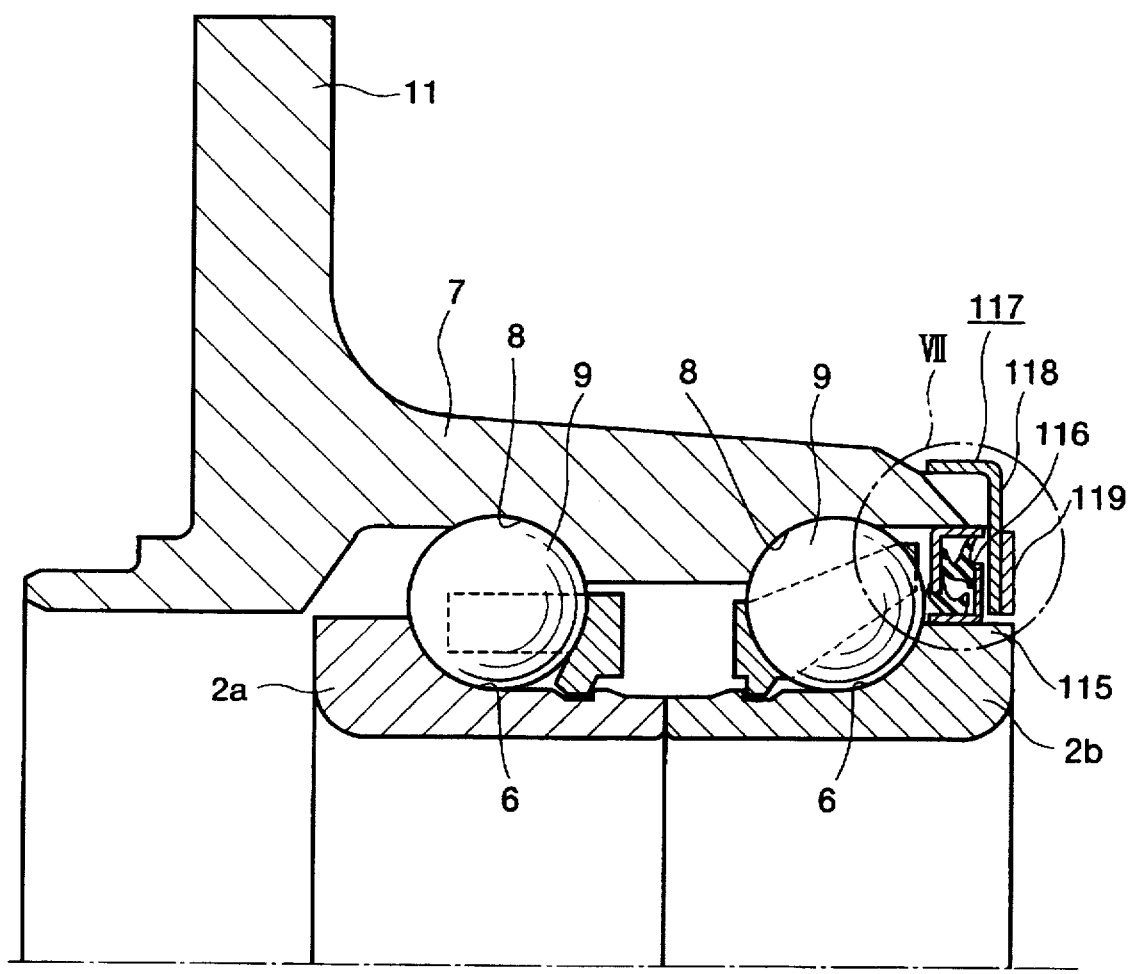
FIG. 6 is a cross sectional view showing one example of the conventional constructions.
Figure 7:
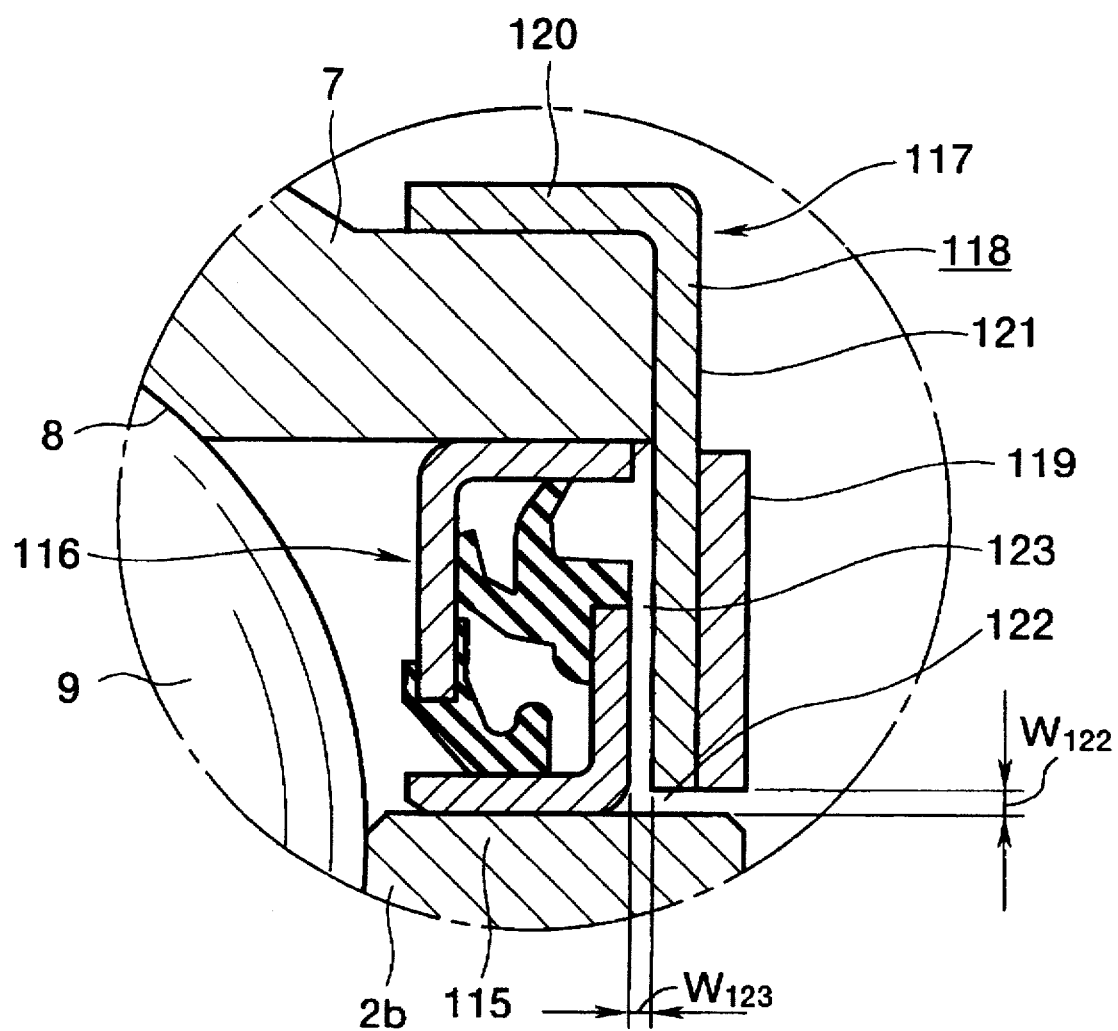
FIG. 7 is an enlarged view of the section VII of FIG. 6.

FIGS. 6 and 7 show another embodiment of the present invention.

The outer ring 7 is rotatable and has an inner peripheral surface on which rotatable outer ring raceways 8 are formed in rows.

The outer ring 7 has an outer peripheral surface portion at the axially outer end (left end in FIG. 6) from which flange 11 extends to mount a vehicle wheel around the outer ring 7.

Disposed on the inside of the outer ring 7 in a concentric relationship with the outer ring 7 is inner rings 2a, 2b which have an outer peripheral surface on which an inner ring raceway 6 is formed.

The inner rings 2a, 2b are stationary and securely fixed to the axle (not shown) supported by the suspension apparatus during use.

Disposed between the outer ring raceways 8 and the inner ring raceways 6 are a plurality of rolling members 9, respectively, to rotatably support the outer ring 7 around the inner rings 2a, 2b.

The inner ring 2b located on the widthwise inside (right side in FIG. 6) of a vehicle when installed in the vehicle, has one end formed with a shoulder portion 115 having an outer peripheral surface.

Disposed between the outer peripheral surface of the shoulder portion 115 and the inner peripheral surface at the axially inner end of the outer ring 7 (right end in FIGS. 6 and 7) is a composite seal ring 116 to seal between the both peripheral surfaces.

Figure 8A:
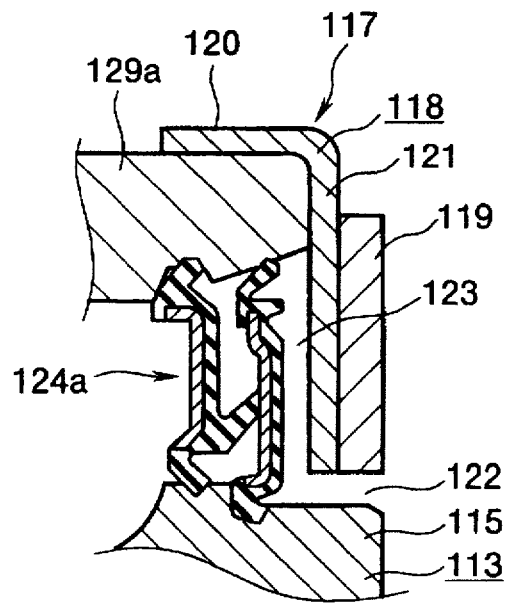
FIG. 8(A) is a cross sectional view showing another example of the seal ring.
Figure 8B:
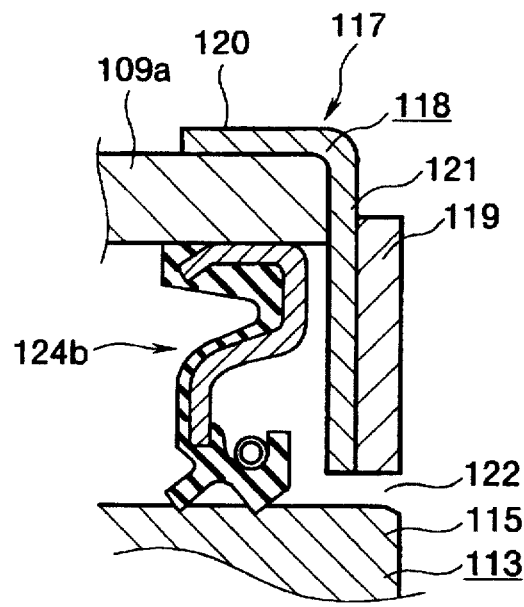
FIG. 8(B) is a cross sectional view showing another example of the seal ring.
Figure 8C:
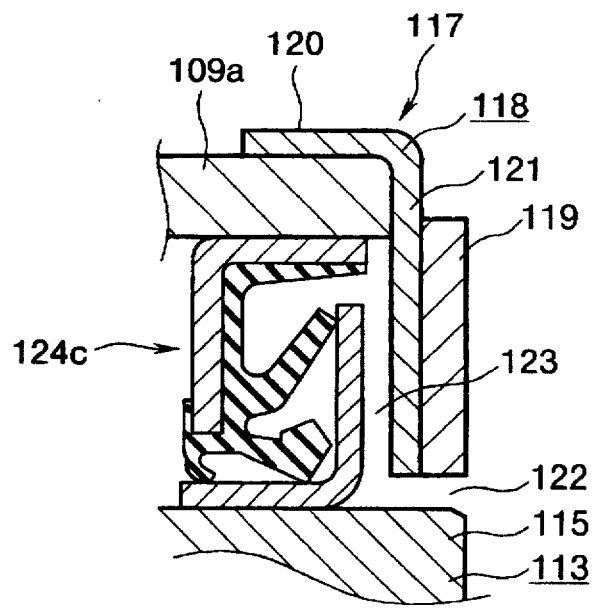
FIG. 8(C) is a cross sectional view showing another example of the seal ring.

In stead of the seal ring 116 as shown in FIGS. 6 and 7, various seal rings 124a to 124c as shown in FIGS. 8(A) to 8(C).

Securely fitted into the end of the outer ring 7 (right end in FIGS. 6 and 7) is a tone wheel 117 which comprises a generally annular support ring 118 made from a metal plate through a bending process to have a L shape in cross section, and a main portion 119 made from a permanent magnet to alternately have S-poles and N-poles in a circumferential direction.

The support ring 118 comprises a cylindrical portion 120 and a circular ring portion 121. The cylindrical portion 120 is securely fitted onto the outer peripheral portion at the axially inner end of the outer ring 7.

The main portion 119 of the tone wheel 117 is fixed through adhesive etc. to the circular ring portion 121 on the opposite side face with reference to the composite seal ring 116 (on the right side face of the circular ring portion 121 in FIGS. 6 and 7).

The inner diameter of the circular ring portion 121 is slightly larger than the outer diameter of the shoulder portion 115 of the inner ring 2b.

The radial gap 122 between the inner peripheral edge of the circular ring 121 and the outer peripheral surface of the shoulder portion 115 has a limited width $W_{122}$.

Since the circular ring portion 121 is located close to the composite seal ring 116, the width $W_{123}$ of the axial gap between the circular ring portion 121 and the composite seal ring 116 is also small. Specifically, the width $W_{122}$ of the radial gap 122 and the width $W_{123}$ of the axial gap 123 are controlled in the range of 0.3 to 1.0 mm.

It will be noted that a labyrinth seal is formed in the radial and axial gaps 122, 123 defined by the inner peripheral edge and the axially outer side surface (left side surface in FIGS. 6 and 7) of the tone wheel 117, the outer peripheral surface at the axially inner end (right end in FIGS. 6 and 7) of the inner ring 2b and the composite seal ring 116 positioned close to each other.

The rolling bearing unit having a tone wheel in the present invention of mentioned above is used to have the inner rings fitted and fixed to an axle (not shown) supported by a suspension apparatus, while the free wheel of the vehicle is supported and fixed to a flange formed in the outer peripheral surface of the outer ring. Moreover, a stationary member such as the suspension apparatus or one part of axle etc., is provided to support a sensor (not shown) in condition of being opposed to a side face (right side in FIG. 6 and 7) of an annular member of the tone wheel. When the free wheel rotates, the sensor detects the alternately passing of the S-poles and N-poles, and the rotating speed of the outer ring rotated with the free wheel is detected.

Especially, in case of the rolling bearing unit having a tone wheel of the present invention, the freedom of planning the seal ring is large, because the tone wheel is independently provided to the combination seal ring or seal ring such as seal rings 124a to 124c etc. And, such as miniaturizing of the seal ring, miniaturizing of the rolling bearing unit having a tone wheel is possible. Moreover, a common seal ring can be used in the bearing unit in which the inner ring rotates and in the bearing unit in which the outer ring rotates and in the bearing unit in which the outer ring rotates. Moreover, because the tone wheel 117 forms a labyrinth seal outside the seal ring, the load of the seal ring is decreased due to the fact of preventing foreign substance from entering the rolling bearing unit. Accordingly, an inexpensive seal ring, although lower seal performance, can be used.

The rolling bearing unit having a tone wheel in the present invention is composed and operated mentioned above. Accordingly, the effects ① and ② is obtained as follows.

① The freedom of designing a seal ring is large, and miniaturizing of the rolling bearing unit having a tone wheel is possible.

② A common seal ring is used between the bearing unit where the inner ring rotates and the bearing unit where the outer ring rotates. Moreover, the cost of seal ring is decreased because the load of the seal ring is decreased due to the fact of preventing foreign substance from entering the rolling bearing unit.

What is claimed is:

1. A rolling bearing unit comprising:

a stationary bearing ring having a first peripheral surface on which a first raceway is formed, a rotatable bearing ring having a second peripheral surface on which a second raceway is formed to provide a space with an opening between the first and second peripheral surfaces, a plurality of rolling members provided between the first and second raceways, a seal device comprising a generally annular seal ring having an elastic seal member and a core metal to reinforce the seal member, thereby closing the opening of the space between the first and second peripheral surfaces, and an annular tone wheel provided on one axial side of the seal device and having South and North poles alternately arranged in a circumferential direction, the seal device having an annular part shaped to extend from the opening of the space outwards to support the tone wheel, the tone wheel having an outer diameter which is larger than the inner diameter at the opening of the radially outer one of the stationary and rotatable bearing rings, and an inner diameter which is smaller than the inner diameter at the opening of the radially outer one of the stationary and rotatable bearing rings.

2. A rolling bearing unit comprising a rotatable outer ring having an inner peripheral surface on which an outer ring raceways is formed, a stationary inner ring having an outer peripheral surface on which an inner ring raceway is formed, a plurality of rolling members provided between the outer and inner ring raceways, a seal ring provided between the outer peripheral surface at one end of the inner ring and the inner peripheral surface at one end of the outer ring to seal the space between the inner and outer peripheral surfaces, and a tone wheel having North and South poles arranged alternately in a circumferential direction and provided at one end of the outer ring in a concentric relationship with the outer ring, the tone wheel made independent from the seal ring and securely supported by the outer ring outside the seal ring, and the tone wheel having an inner peripheral edge located close to the inner ring at one end thereof to form a labyrinth seal.

3. A rolling bearing unit comprising a rotatable outer ring having an inner peripheral surface on which an outer ring raceway is formed and an opening portion which is provided at one end thereof and has an inner diameter, a stationary inner ring having an outer peripheral surface on which an inner ring raceway is formed, a plurality of rolling members provided between the outer and inner ring raceways, a seal ring provided between the outer peripheral surface at one end of the inner ring and the inner peripheral surface at the one end of the outer ring to seal the space between the inner and outer peripheral surfaces, and a tone wheel having North and South poles arranged alternately in a circumferential direction and provided at the one end of the outer ring in a concentric relationship with the outer ring, and the tone wheel being securely supported by the outer ring and formed in a disk shape so as to have a flat side face magnetized to provide the North and South poles, such that the flat side face has an outer diameter sized larger than the inner diameter of the opening portion at the one end of the outer ring, and an inner diameter sized smaller than the inner diameter of the opening portion of the outer ring.

* * * * *